United States Patent [19]

Farenelli et al.

[11] Patent Number: 5,131,048
[45] Date of Patent: Jul. 14, 1992

[54] AUDIO DISTRIBUTION SYSTEM

[75] Inventors: Robert Farenelli; Bruce B. Stevenson; Bill R. Unseld, all of Lexington, Ky.

[73] Assignee: Square D Company, Palatine, Ill.

[21] Appl. No.: 639,507

[22] Filed: Jan. 9, 1991

[51] Int. Cl.⁵ .................................... H04R 27/00
[52] U.S. Cl. ........................... 381/81; 381/85; 379/170
[58] Field of Search .............. 379/170; 381/81, 80, 381/77, 85

[56] References Cited

U.S. PATENT DOCUMENTS

| | | | |
|---|---|---|---|
| 3,795,769 | 3/1974 | Nowka et al. | 381/77 |
| 4,107,464 | 8/1978 | Lynch et al. | 381/81 |
| 4,217,573 | 8/1980 | Norris | 340/147 |
| 4,347,604 | 8/1982 | Saito et al. | 370/85 |
| 4,481,660 | 11/1984 | de Koning et al. | 381/58 |
| 4,695,880 | 9/1987 | Johnson et al. | 358/86 |
| 4,835,604 | 5/1989 | Kondo et al. | 358/86 |
| 4,862,159 | 8/1989 | Marusa et al. | 340/825.24 |
| 4,885,803 | 12/1989 | Hermann et al. | 455/603 |
| 4,901,367 | 2/1990 | Nicholson | 455/5 |
| 4,920,432 | 4/1990 | Eggers et al. | 360/33.1 |
| 5,018,021 | 5/1991 | Slater | 358/349 |

OTHER PUBLICATIONS

Sonance, San Clemente, CA, Sonamp 260 and Sonamp 260x3, Catalog Sheet, Summer 1990.
Russound, Speaker Switching & Distribution Systems FMP, Inc., Newmarket, NH, SDB-4-120, RD-4, SC-12, Catalog Sheet, Jul. 1, 1990.
Tab Books Inc., Blue Ridge Summit, PA, "101 Sound, Light and Power IC Projects", Charles Shoemaker, pp. 111-115, 1986.

Primary Examiner—Stafford D. Schreyer
Attorney, Agent, or Firm—Jose W. Jimenez; Robert J. Crawford; Larry I. Golden

[57] ABSTRACT

A signal distribution and communication arrangement controls the broadcast of different types of signals through speakers located in various zones. The arrangement includes an audio receiver circuit which responds to a music signal from an external music source, and an associated threshold detection circuit which provides a music mute function. Further, a page interface circuit, responds to a page signal generated from a telephone handset, which generates a paging control signal and serves as a power source to the telephone handset; and a doorbell interface circuit responds to any of a plurality of doorbell signal sources at differing locations by generating a doorbell control signal and activating a corresponding door bell tone sequence which identifies the location of the doorbell signal source. Finally, a control circuit, responds to these various circuits by selecting which of the corresponding signals should be broadcast by the speakers.

20 Claims, 10 Drawing Sheets

AUDIO DISTRIBUTION SYSTEM

FIELD OF THE INVENTION

The present invention relates generally to audio distribution systems and, more particularly, to circuit arrangements for integrating various types of signals in audio distribution systems.

BACKGROUND OF THE INVENTION

Home owners are rapidly becoming aware of the benefits of home audio distribution systems. These benefits include convenient access to audio signals throughout the home, more efficient use of space, and savings in the form of fewer system components.

Audio distribution systems range from those distributing stereo signals only, to those incorporating other functions such as doorbells and intercoms. These systems frequently utilize a switching matrix to distribute a signal, generated and amplified by a stereo system, to various rooms throughout the house. Speakers in the various rooms typically receive the amplified signal through a distribution panel co-located in the room with the stereo system.

Prior art systems offering integrated functions such as distribution of stereo, doorbell, and intercom signals have several setbacks. For example, many of these prior art systems seeking to improve sound quality have utilized the home owner's high power stereo system and a switching matrix to distribute a pre-amplified stereo signal. Unfortunately, these systems are unable to effectively integrate other important features, such as doorbell and paging.

Another setback of prior art systems is the inconvenience of using the intercom. These systems typically have the page button and speaker/receiver located on the audio distribution wall unit. This requires the intercom user to go to the location of the intercom system, as opposed to accessing it from a more convenient location.

Accordingly, there is a need for an audio distribution system that can be implemented without the aforementioned shortcomings.

SUMMARY OF THE INVENTION

A general object of the present invention is to provide a signal distribution and communication arrangement which overcomes the above deficiencies.

Another object of the present invention is to provide an arrangement for controlling the broadcast of a plurality of different types of signals through speakers located in various zones, using a control circuit which responds to various signal interface circuits by selecting which of the music, audio, page and doorbell signals from the interface circuits should be broadcast through the speakers.

In one preferred embodiment, these and other objects of the present invention are realized using a signal distribution and communication arrangement for controlling the broadcast of a plurality of different types of signals through speakers located in various zones. The arrangement includes an audio receiver for receiving a substantially continuously generated signal; a tone generator circuit, responsive to at least one door bell generator signal, for generating a predetermined tone; a telephone line interface circuit which is responsive to a page signal received over associated telephone lines; an amplifier circuit, coupled to the speakers, which amplifies the substantially continuously generated signal, the predetermined tone and the page signal; and, in response to the audio receiver, to the tone generator circuit and to the telephone line interface circuit, a control circuit prioritizes, selects, and couples the substantially continuously generated signal, the predetermined tone and the page signal to the amplifier circuit for broadcast through the speakers.

BRIEF DESCRIPTION OF THE DRAWINGS

Other objects and advantages of the invention will become apparent upon reading the following detailed description and upon reference to the drawings in which.

Figure 1:
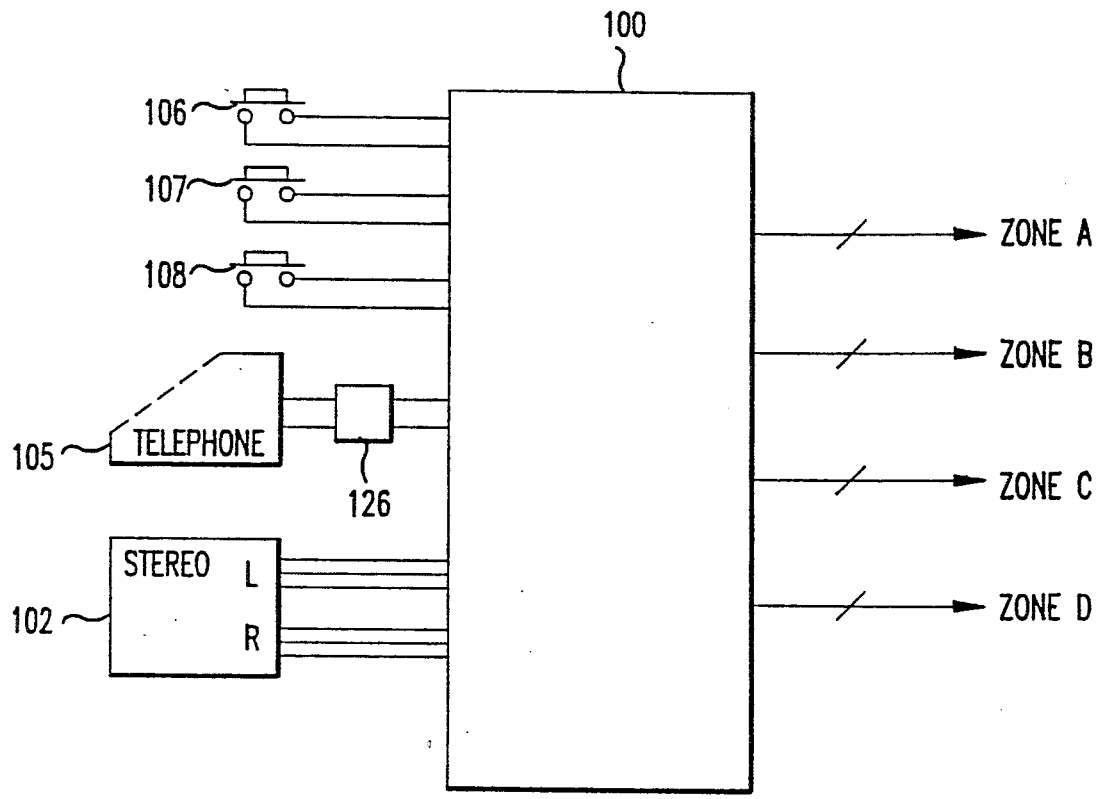
FIG. 1 is a block diagram of an audio distribution amplifier system, according to the present invention.

While the invention is susceptible to various modifications and alternative forms, a specific embodiment thereof has been shown by way of example in the drawings and will be described in detail. It should be understood, however, that it is not intended to limit the invention to the particular form described. On the contrary, the intention is to cover all modifications, equivalents, and alternatives falling within the spirit and scope of the invention as defined by the appended claims.

DESCRIPTION OF THE PREFERRED EMBODIMENTS

FIG. 1 illustrates the basic configuration of the present invention in a typical application. The audio distribution amplifier (ADA) system 100 receives as inputs left and right line level signals from the home owner's personal stereo 102, substantially continuous audio signals from a telephone handset 105, intermittently generated control signals from a paging device located within the telephone handset, and any of a plurality of intermittently generated doorbell signals from a multiplicity of different doorbell sources 106, 107 or 108 at various locations. The ADA system 100 generates, as outputs to speakers located in a plurality of different zones A-D, any of the following: a multi-tone doorbell signal indicating from which of a multiplicity of sources 106, 107, and 108 the doorbell signal originated; a voice paging message originating from someone speaking into a telephone handset 105 after a page command is initiated; or amplified left and right stereo signals corresponding to line level signals received from the home owner's personal stereo 102.

Figure 2:
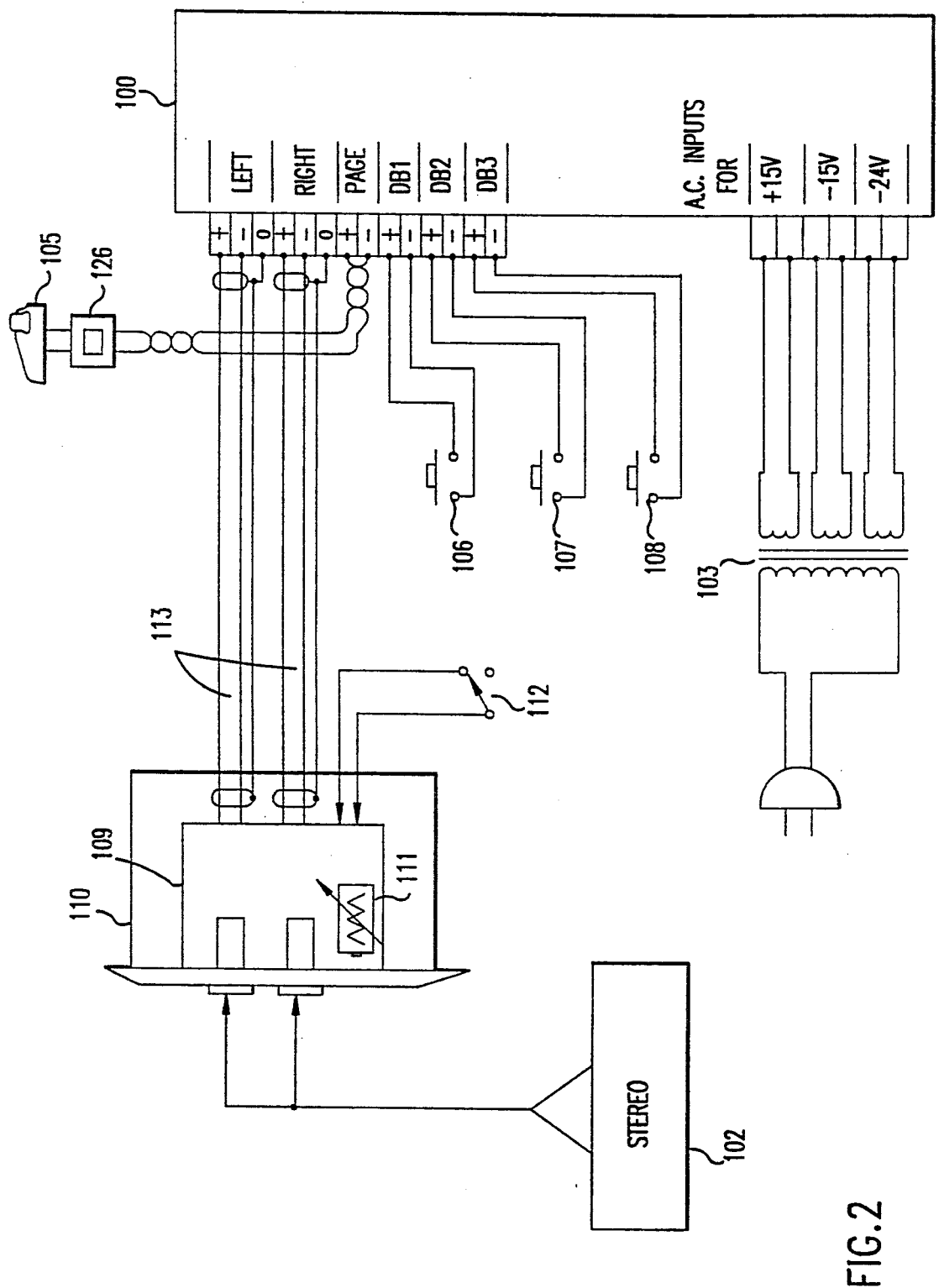
FIG. 2 is a diagram illustrating, in more detail, various inputs to the audio distribution amplifier system of FIG. 1.

The interface between the ADA system 100 and the output of the stereo 102 is illustrated in FIG. 2. The interface includes a wall plate interface circuit 110 which receives and buffers left and right signals from a typical consumer music system, such as a stereo amplifier or radio receiver 102. The range of stereo output signal levels and impedances is preferably from 0.1 V to 1.0 V (peak to peak) and 10 kOhms to 100 kOhms, respectively. A remote master gain control 111 in the wall plate interface circuit 110 (mounted on printed circuit board 109) provides volume control. Ideally, the wall plate interface circuit 110 (and the gain control 111) are located near the associated stereo so that the stereo signal may be properly distributed without degradation.

The interface illustrated in FIG. 2 also includes a remote stereo defeat control switch 112 which disables the stereo signals presented to the ADA system 100 when closed. When the defeat control switch is open, the left and right signals from the stereo 102 are delivered to the ADA system 100 via two signal cables 113. Each signal cable preferably consists of two 22 A.W.G. conductors with a bell foil shield and drain wire. The cable lengths should be between 20 and 200 feet.

FIG. 2 illustrates the telephone handset 105 from which a paging command is initiated. In a preferred embodiment, a telephone handset with a page button, such as a Square D Elan Paging Button Part No. 40603-120-01 or a Gemini Electronics Two-Line-Button With Hold Feature, is used.

Figure 4:
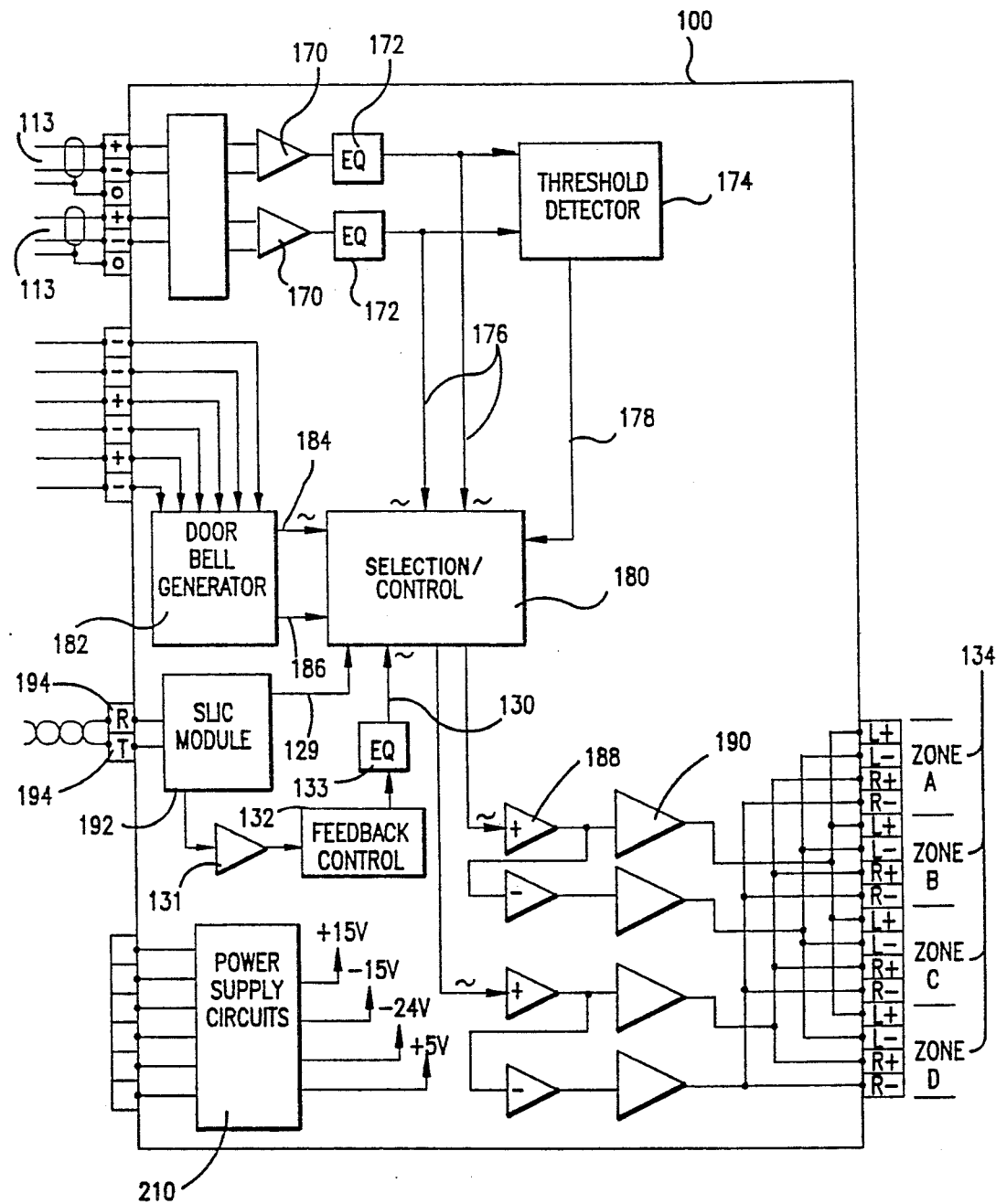
FIG. 4 is a block diagram, according to the present invention, which illustrates the basic functional circuits internal to the audio distribution amplifier of FIG. 2.

Upon pressing the page button 126 on the telephone handset 105, the telephone handset generates a monaural paging signal. The monaural paging signal is supplied to the ADA system 100 via a standard two-wire telephone tip and ring (T and R) interconnection 194 (FIG. 4). The monaural paging signal activates the Station Line Interface Circuit (SLIC) 192 (e.g., using an AMS 2406-type integrated circuit). The SLIC 192 then disconnects the telephone handset and serves as a telephone handset power source during the page.

Power to the ADA system 100 may be provided using a conventional AC domestic power source (not shown) and a transformer 103 providing +15 V, −15 V and −24 V AC power levels to the ADA system 100. Power to the wall plate interface circuit is provided by a power supply in the ADA 100 (wires not shown).

Figure 3:
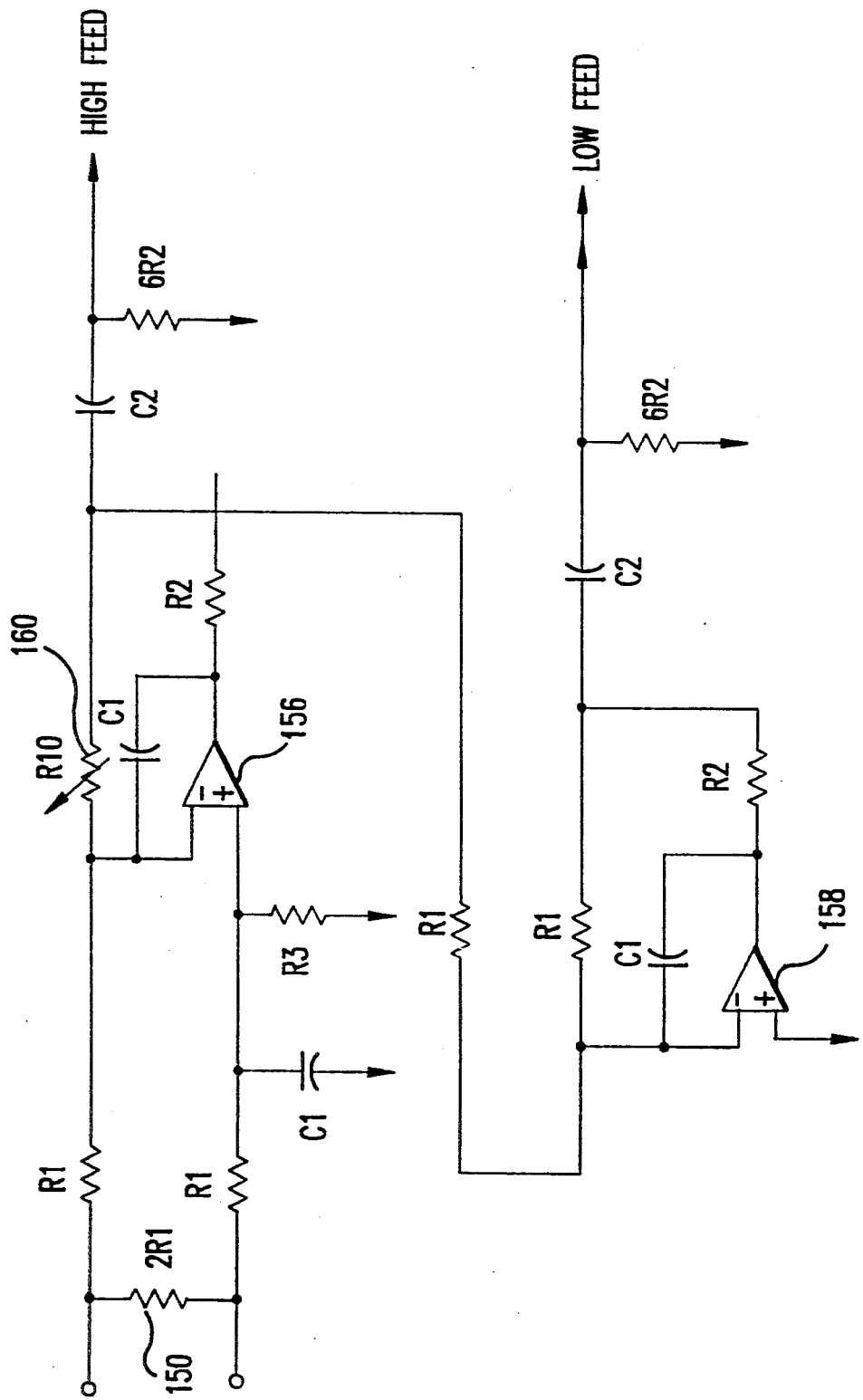
FIG. 3 is a circuit diagram illustrating a preferred embodiment of one of two identical wall plate interface circuits, in accordance with the present invention, which may be used as a buffer between the stereo system and the audio distribution amplifier of FIG. 2.

Referring now to FIG. 3, there is illustrated one of two identical wall plate interface circuits which may be used for converting and buffering a respective one of the left or right stereo signals from a single-ended to a balanced signal. The circuit includes a balanced termination resistor 150 for receiving the stereo signal, and conventionally arranged high and low feed amplification circuits based around TL074-type operational amplifiers 156 and 158. The resistor and capacitor values in the circuit of FIG. 3 may be implemented using 100 kOhm for R1, 100 Ohms for R2, pico-Farads for C1 and 100 micro-Farads for C2. The potentiometer denoted 160 is preferably implemented using a 49.9 kOhms component.

FIG. 4 illustrates, in block diagram form, the basic functional circuits internal to the ADA system 100 of FIG. 2. From the stereo signal cables 113 provided by the wall plate interface circuit of FIG. 3, the stereo (or music) signal is received by conventional pre-amplification and equalization circuit stages 170 and 172 and by threshold detection circuitry 174, the latter of which monitors the left and right stereo signal feeds 176 for low level audio signals. In response to the stereo signals being absent or at a negligible level, the detection circuitry 174 initiates a control signal, over feed 178, which effectively instructs a selection/control circuit 180 to block any noise at the output of the equalization stages 172 from reaching the speakers.

Figure 6A:
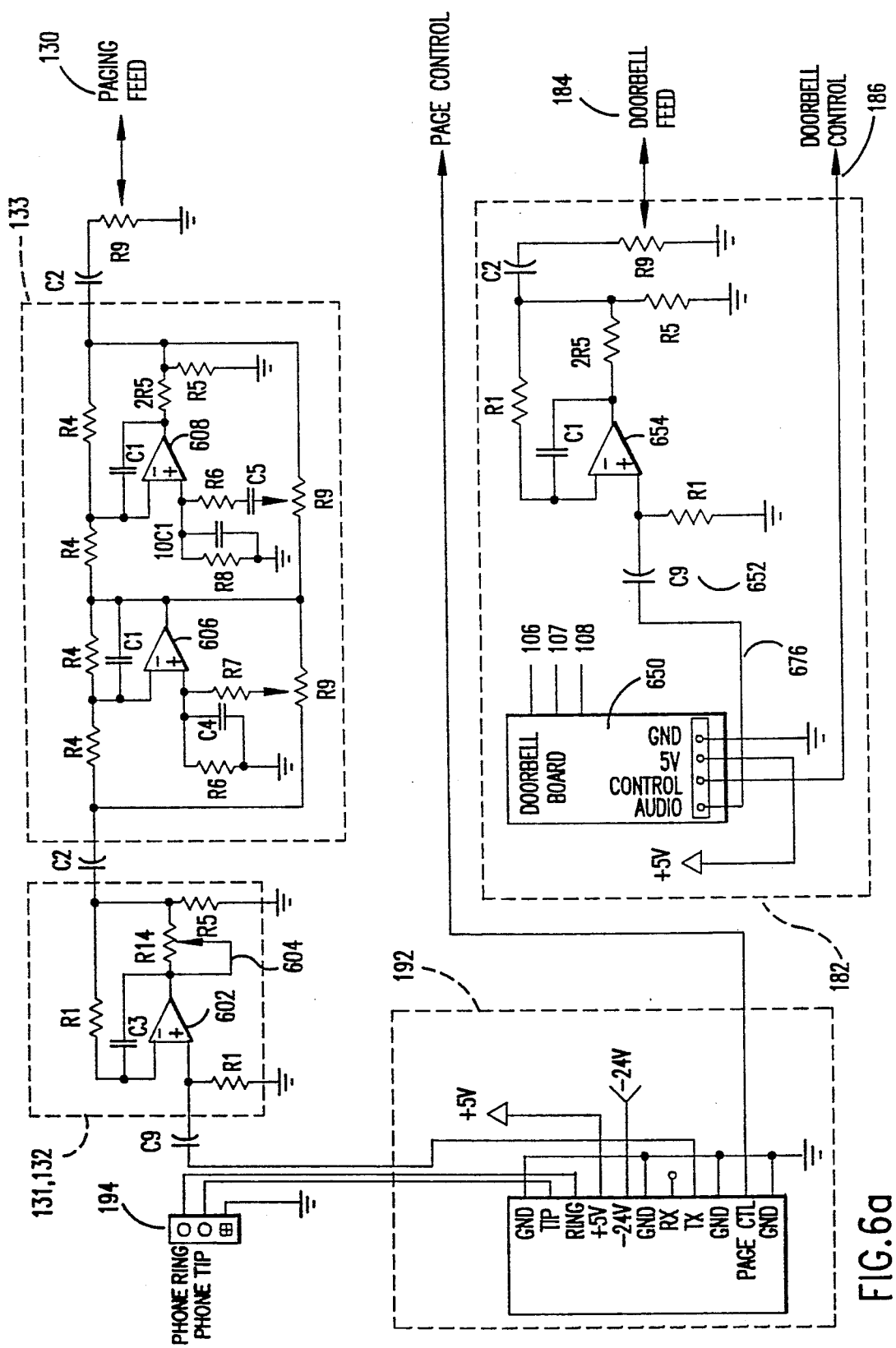
FIG. 6a is a circuit diagram illustrating a preferred embodiment of the station line interface, the page signal feedback control, the page signal equalization and the doorbell generator circuits of FIG. 4.
Figure 6B:
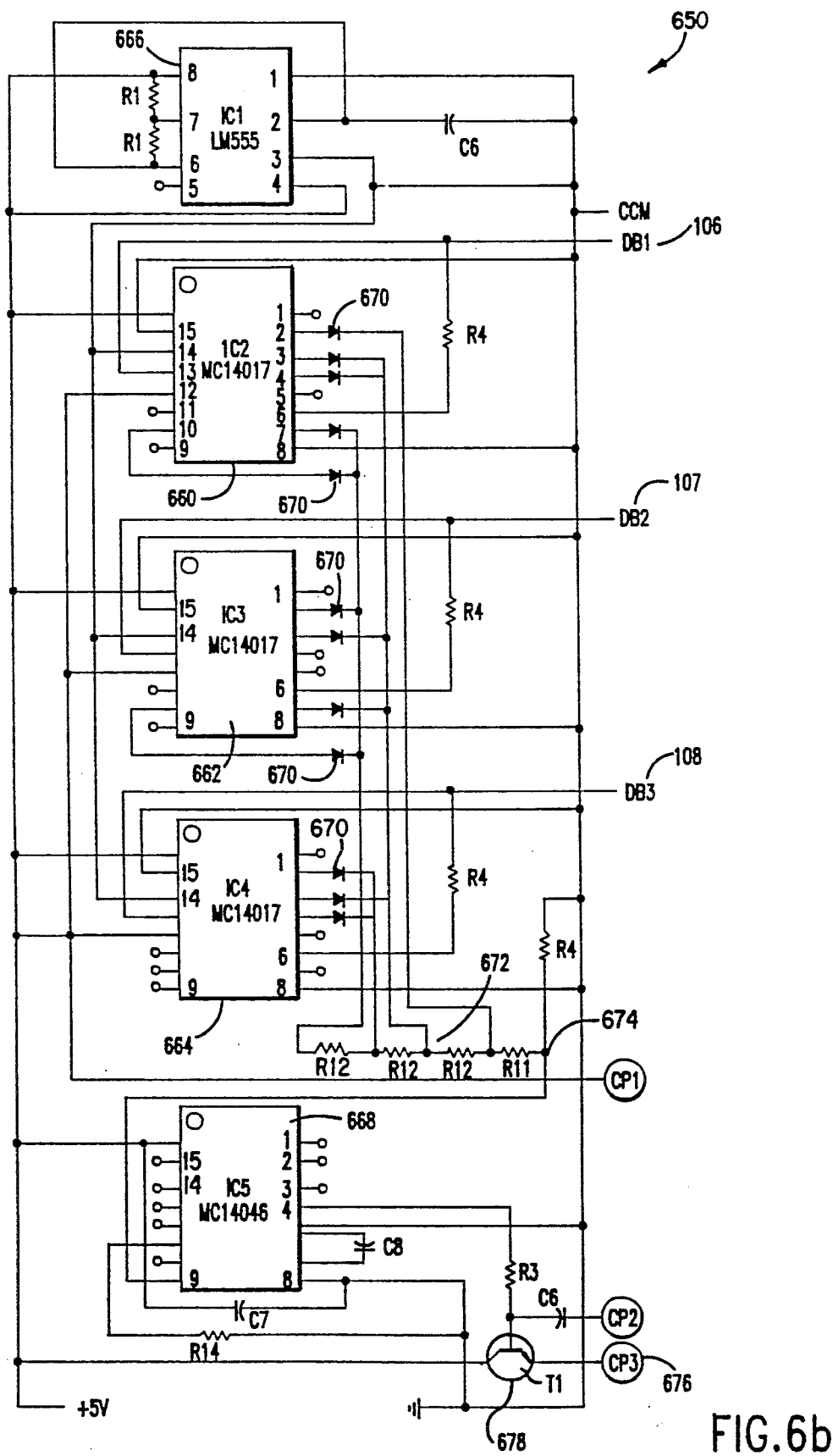
FIG. 6b is a circuit diagram illustrating the doorbell generator circuit of FIG. 4.

A momentary closure of any of the plurality of doorbell switches (e.g., from 106-108 of FIGS. 1-2) will cause an intermittent doorbell signal to be received by a door bell generator circuit 182 (FIG. 6b). The door bell generator circuit 182 then creates two signals. The first is a unique tone sequence 184 which will identify which of the three doorbell switches initiated the doorbell signal. The second is a doorbell control signal 186 which the selection/control circuit 180 uses to mute the stereo signal inputs 176 and unmute the unique tone sequence 184 so it can be coupled to pre-amplifiers 188 and power amplifiers 190, which amplify the signal selected from the selection/control circuit 180 using conventional circuitry.

Further, upon receiving the monaural paging signal over the T and R lines, the SLIC 192 generates a page control signal (feed 129) which the selection/control circuit 180 uses to mute the stereo signal and unique tone sequence 176 and 184, and unmute the page signal input 130. The SLIC should then receive an audio message from the party initiating the page command, and transmit this page signal information to the ADA system 100. The page signal information is also passed through a feedback control circuit stage 132 which prevents significant signal degradation of the audio message, which may result if the telephone handset is located near a speaker. From the feedback control circuit stage 132, the page signal information is passed through an equalization circuit stage 133 to enhance the voice integrity of the audio message.

A conventional power supply/rectification circuit 210 may be used to convert the AC power levels to complementary DC power levels for the above described circuitry.

FIG. 4 further illustrates the signal selection/control circuit 180 as coupling the selected stereo 176, unique tone sequence 184, and page signal 130 to the output amplifiers 188 and 190. When more than one control signal is presented to the selection/control circuit simultaneously, the input signal with the highest priority is coupled to the speakers. The signal priorities for the illustrated embodiment are from highest to lowest: page, doorbell, stereo and then mute.

FIG. 4 further illustrates the output amplification stages 188 and 190 of the ADA. The arrangement uses conventional audio pre-amplification and power amplification circuitry 188 and 190 to distribute the selected information signal to speakers in a plurality of different zones A-D 134.

Figure 5:
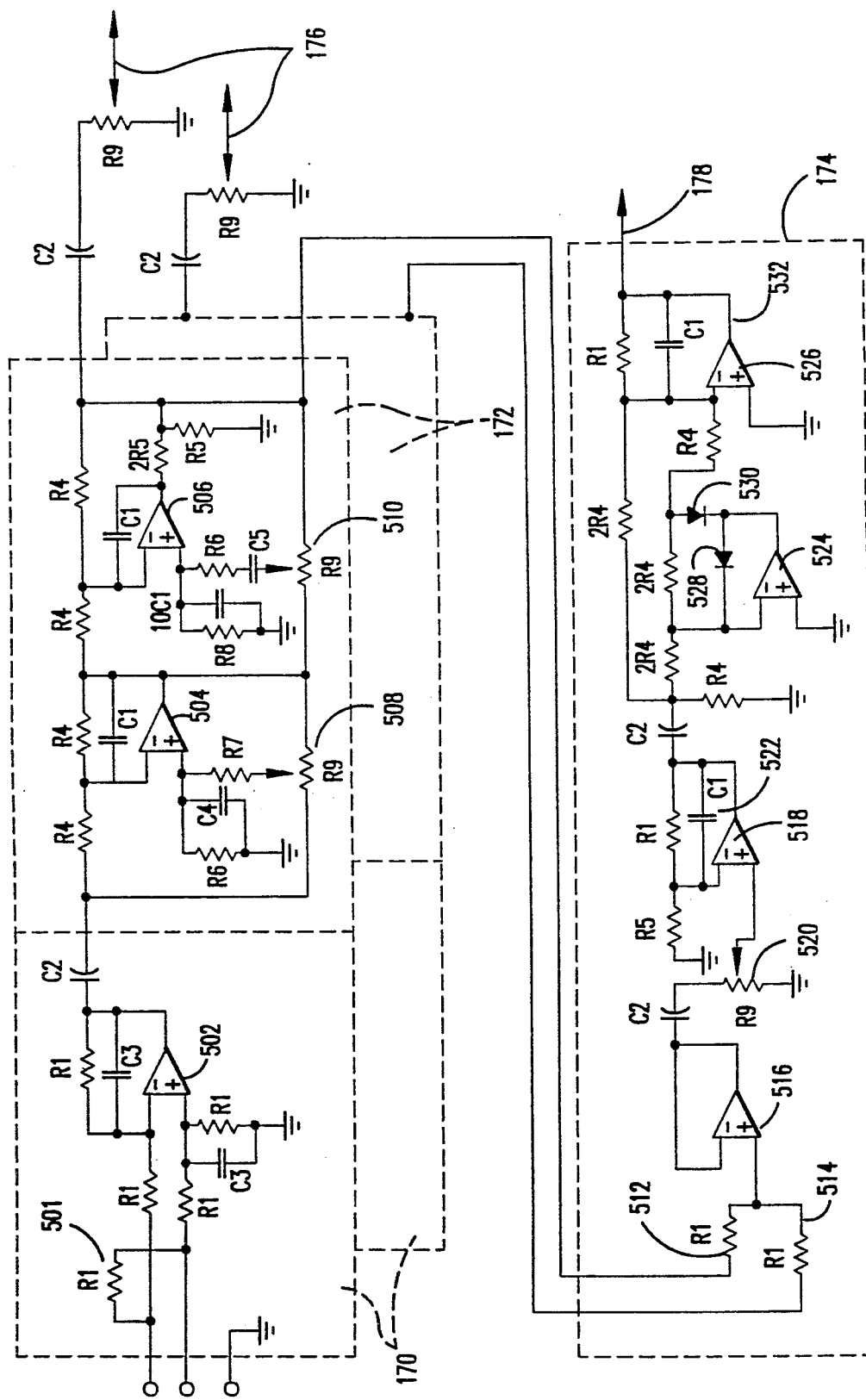
FIG. 5 is a circuit diagram illustrating a preferred embodiment of the stereo signal pre-amplification and equalization stages and the threshold detection circuitry of FIG. 4.

FIG. 5 illustrates a preferred circuit for implementing the stereo pre-amplification and equalization stages 170 and 172 and the threshold detection circuit 174 of FIG. 4. The illustrated stereo pre-amplification circuit 170 is one of two identical circuits used to convert a respective one of the left or right stereo signals from a balanced signal to a single-ended signal. The circuit includes a balanced termination resistor 501 and a conventionally arranged amplification circuit based around a TL074-type operational amplifier 502. The resistor and capacitor values in the pre-amplification circuit 170 of FIG. 5 may be calculated using 100 kOhms for R1, 100 micro-farads for C2 and 47 pico-farads for C3.

Figure 9:
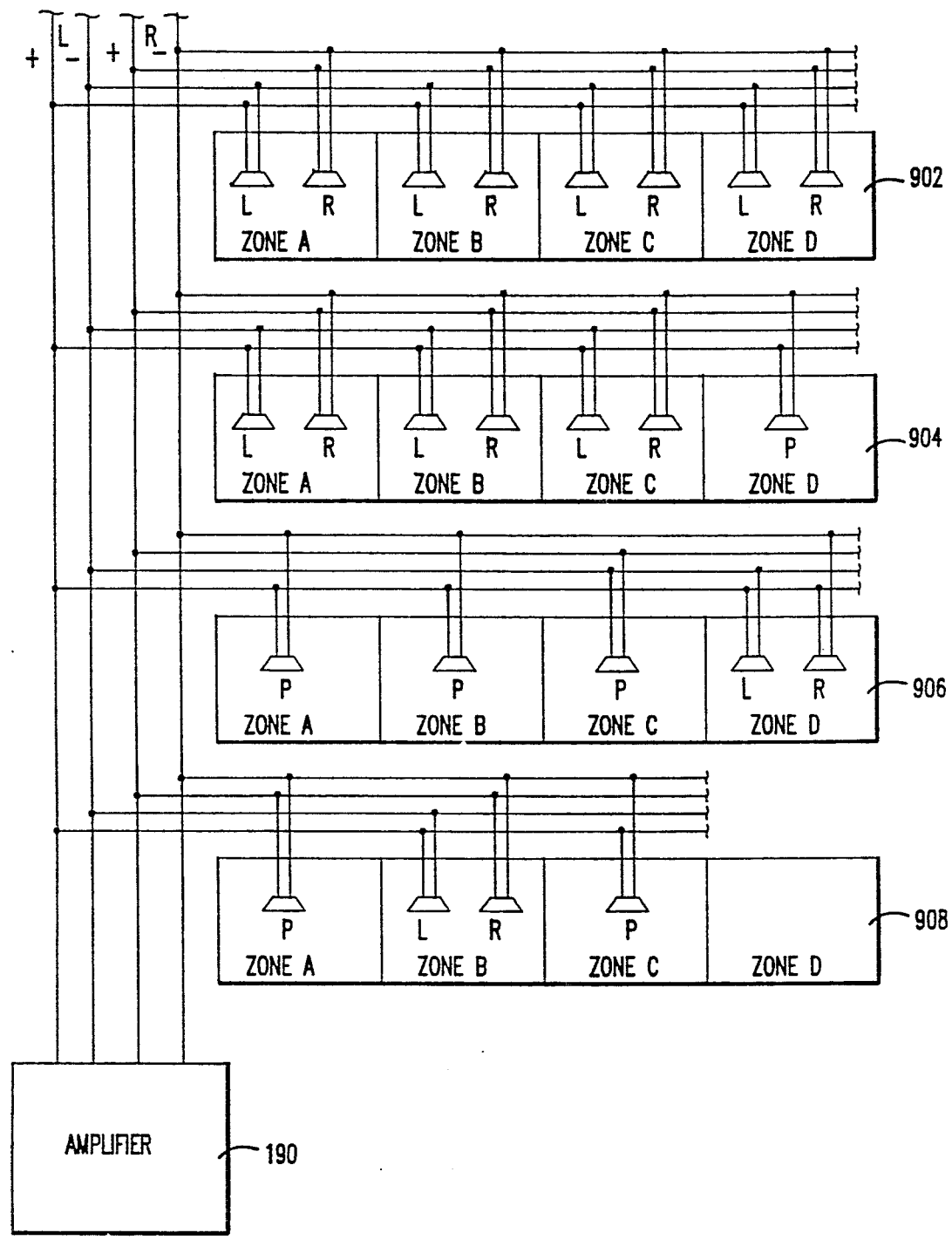
FIG. 9 is a diagram illustrating four preferred speaker hook-up configurations using the present invention.

The equalization stage 172 is similarly one of two identical circuits used to compensate a respective left or right stereo signal for reduced volume levels and frequency response roll-off caused by the ADA speakers (FIG. 9). The circuit includes treble and base equalization stages based around TL074-type operational amplifiers 504 and 506 respectively. The resistor and capacitor values in the equalization circuit 172 of FIG. 5 may be implemented using 10 kOhms for R4, 1 kOhms for R5, 22.6 kOhms for R6, 29.4 kOhms for R7, 18.2 kOhms for R8, 10 pico-farad for C1, 0.039 micro-farad MYLAR for C4, and 0.001 micro-farad MYLAR for C5. The potentiometers denoted 508 and 510 are preferably implemented with 10 kOhms as the maximum value.

The threshold detection circuit 174 monitors the left and right stereo signal lines 176 for low level audio signals. As mentioned above, when the stereo signal levels are absent, or their levels become negligible, the DC control line 178 goes high, which instructs the selection/control circuit to mute the stereo channel (180 of FIG. 4).

The threshold detection circuit 174 includes two summation resistors 512 and 514 and a TL074-type operational amplifier 516 in a buffered voltage-follower configuration. From the amplifier 516, the buffered signal is AC coupled to a threshold-level adjustment potentiometer 520 and a second stage which provides amplification of the stereo signal using a TL074-type operational amplifier 518 with a gain of 100. A capacitor 522 connected between the amplifier's (518) output and negative input provides noise reduction for the stereo signal.

The final stages of the threshold detection circuit 174 include a pair of TL074-type operational amplifiers 524 and 526 arranged for signal rectification and amplification. The first amplifier 524 provides rectification using a pair of diodes 528 and 530, while the second operational amplifier 526 amplifies the control signal 178. A capacitor 532 provides additional noise reduction. The resistor and capacitor values in the threshold detection circuit 174 of FIG. 5 may be implemented using 100 kOhms for R1, 10 kOhms for R4, 1 kOhm for R5, 10 pico-farads for C1, and 100 micro-farads for C2. The potentiometer denoted 520 preferably limits at the upper end at 10 kOhms.

Turning now to FIG. 6a, the circuit embodiments of the paging function's SLIC 192, pre-amplification, feedback control and equalization stages 131-133 of FIG. 4 are illustrated. The SLIC 192, which is preferably implemented using an AMS 2406-type integrated circuit configured as shown in FIG. 6, processes the audio signal received through the tip and ring lines by passing the signal from its TX output to the pre-amplification circuit 131.

The illustrated pre-amplification and feedback control circuitry 131-132 includes a buffer-type circuit arrangement based around a TL074-type operational amplifier 602. The feedback control is accomplished using a potentiometer 604 as a current limiting device. If the audio signal begins oscillating, the current limiting provided by the potentiometer 604 prevents the voltage input to the equalization stage 133 from climbing excessively. The resistor and capacitor values in the pre-amplification and feedback control circuits 131-133 may be calculated using 100 kOhms for R1, 1 kOhm for R5, 100 micro-farads for C2, 47 pico-farads for C3, and 33 micro-farads for C9.

The illustrated page signal equalization circuit is identical in operation configuration and component values to the stereo signal equalization circuit 172 of FIG. 5; a circuit description, therefore, is not necessary.

FIG. 6a further illustrates the doorbell generator circuit 182 of FIG. 4. In response to the intermittent closure of any of three doorbell signal sources (e.g., from 106, 107, or 108 of FIGS. 1-2), the doorbell board 650 generates the doorbell control signal 186 for use by the selection/control circuit 180 (FIG. 4), and the unique tone sequence 184 for broadcast and identification of which of the three sources initiated the doorbell signal. The multi-tone sequence is then passed through an AC coupling capacitor 652, and a unity gain buffer circuit based around a TL074-type operational amplifier 654 (operating in a manner similar to the pre-amplification and feedback stages 131-132 of FIG. 6a, and is AC coupled to a potentiometer 655 for level adjustment.

FIG. 6b, which illustrates a preferred circuit embodiment of the doorbell generator board 650, includes a timer 666, three MC14017-type decade counters 660, 662, and 664 and a MC14046-type phase-locked-loop IC 668. The timer 666 is implemented using a 555-type monostable multivibrator IC which oscillates at a relatively low frequency, e.g., about one Hertz. The oscillating signal is provided to each of the three decade counters 660, 662 and 664 as the clock input, and each doorbell switch (when closed) is used as an enable input. Thus, a signal generated by the momentary closure of any of the three doorbell switches enables the respective decade counter chip 660, 662, or 664 to initiate the sequencing of the counter outputs, which are coupled through diodes 670 to a voltage divider (resistor) network 672. As the enabled decade counter cycles, the voltage at the output 674 of the voltage divider 672 changes temporarily to a different DC level, which controls the input voltage of the phase-locked-loop IC 668, which is configured to operate as a voltage-controlled oscillator (VCO). For each DC voltage level input, the VCO outputs a signal of a distinct frequency, and the signal is amplified through a 2N1101 NPN-type transistor 678, with the emitter of the transistor 678 connected to the audio line 676 (FIGS. 6a-6b).

The number of tones that the doorbell generator circuit 182 (FIG. 6) produces in response to a doorbell signal from a particular doorbell source (or switch) depends on the configuration of the corresponding decade counter 660, 662, or 664. As configured in FIG. 6A, an intermittent closure of doorbell switch 1 (DB1), doorbell switch 2 (DB2), or doorbell switch 3 (DB2) will result in a two-, four- or two-tone output respectively. When pin 6 of the enabled decade counter goes high, pin 13, which is connected to pin 6 through a resistor, also goes high, and the counter is disabled. Once disabled, the tone sequence is terminated.

Resistor and capacitor values in the doorbell circuit illustrated in FIGS. 6a–6b may be implemented using 100 kOhms for R1, 10 kOhms for R4, 1 kOhms for R5, 11 kOhms for R11, 680 Ohms for R12, 2.2 kOhms for R13, 10 pico-farads for C1, 100 micro-farads for C2, 2.2 micro-farads for C6, 1.2 micro-farads for C7, 0.01 micro-farads for C8, and 33 micro-farads for C9. Preferred component values for the potentiometers R9 and R14 are 10 kOhms and 50 kOhms, respectively. For further information concerning the operation of the components depicted herein, reference may be made to 101 SOUND, LIGHT AND POWER IC PROJECTS by Charles Shoemaker, TAB BOOKS Inc. of Blue Ridge Summit PA.

Figure 7:
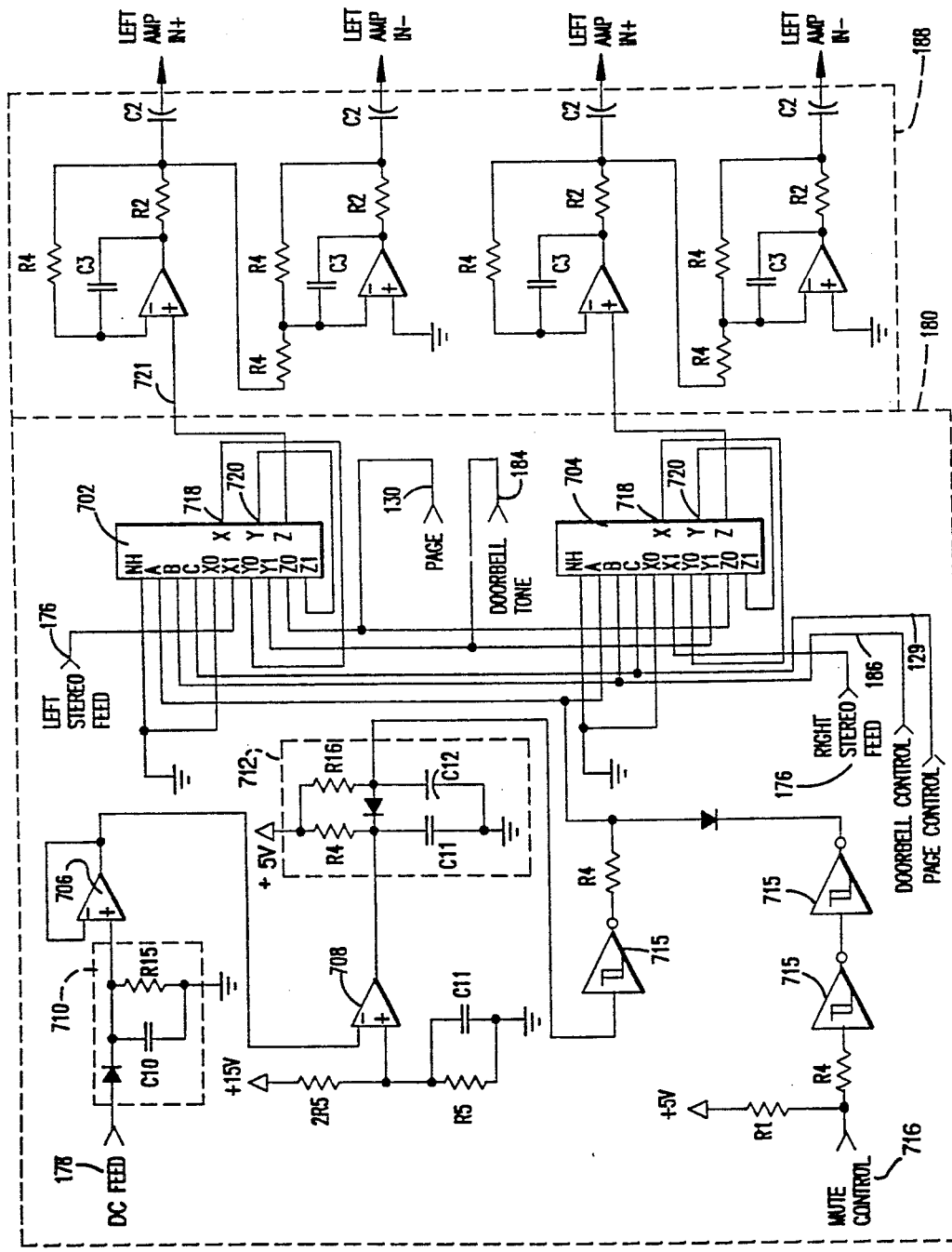
FIG. 7 is a circuit diagram illustrating a preferred embodiment of a control circuit used to implement the threshold detection, mute and audio signal output pre-amplification functions of FIG. 4.

Referring now to FIG. 7, the signal selection/control circuit 180 (FIG. 4) is illustrated as including two 4053-type multiplexers 702 and 704, mute control circuitry centered around 706, 708 and 710 and the pre-amplifiers 188 (FIG. 4). If no stereo signals are present, the threshold detection circuitry 174 of FIGS. 4–5 will supply a threshold control signal 178. This control signal is processed by a peak detector 710 and bufferred by a TL074-type operational amplifier 706. From the amplifier 706, the control signal is compared to a voltage threshold set at the positive input of a comparator 708 to determine if the stereo signal is above this predetermined mute cut-off level. A delay circuit 712 provides approximately one minute of delay to allow changes in music selection without the channel being suddenly muted. Resistors R15 and R16 and capacitors C10, C11 and C12 may be implemented using 220 kOhm, 3.3 megaOhm, 0.1 micro-farad (Mylar), 0.1 micro-farad (Monolithic), and 22 micro-farad (Tantalum) values, respectively.

A mute control signal 716, which is received by the stereo defeat control switch 112 of FIG. 2, is OR-tied (through inverting buffers 715) with the output of the delay circuit 712 so that either the output of the delay circuit 712 or the stereo defeat control switch 112 can mute the music.

Each identical left and right multiplexer 702 and 704 is controlled by the mute function, the doorbell control signal 186 and the page control signal 129 by the respective X, Y and Z control inputs. As feed inputs, each multiplexer 702 and 704 receives left or right stereo signal feeds 716 (FIG. 4) at the X1 input, ground at the X0 input, the page signal 130 at the Z0 input and the doorbell tone sequence 184 at the Y1 input. The Y0 input receives the X output, and the Z1 input receives the Y output, with the Z output being provided to the pre-amplification circuit 188, for priority control. Any audio received at the output (Z) 720 of the multiplexers is converted from a single-ended signal to a balanced signal using the conventional pre-amplification circuitry 188 shown in FIG. 7.

In accordance with this configuration, if the one-minute delay circuit 712 lapses, or if the mute switch 112 is closed, the multiplexers 702 and 704 will choose input X0 and effectively mute the stereo inputs. Otherwise, the multiplexers will pass the stereo signals through to the output (X) 718, to the output (Y) 720 and then to the output (Z) 721 of the multiplexers.

If a doorbell control signal 186 is present, the multiplexers will pass the doorbell tone sequence 184 to the output (Y) 720 and then to the output (Z) 721 of the multiplexer (provided the page control signal 186 is not present). If a doorbell control signal 186 is not present, the multiplexers will pass the output (X) 718 to the output (Z) 720.

If a page control signal 129 is present, the multiplexers will pass the page signal 130 to the output (Z) 721 of the multiplexer (regardless of the presence of any other signals). If a page control signal 129 is not present, the multiplexers will pass the output (Y) 720 to the output (Z) 720.

Figure 8:
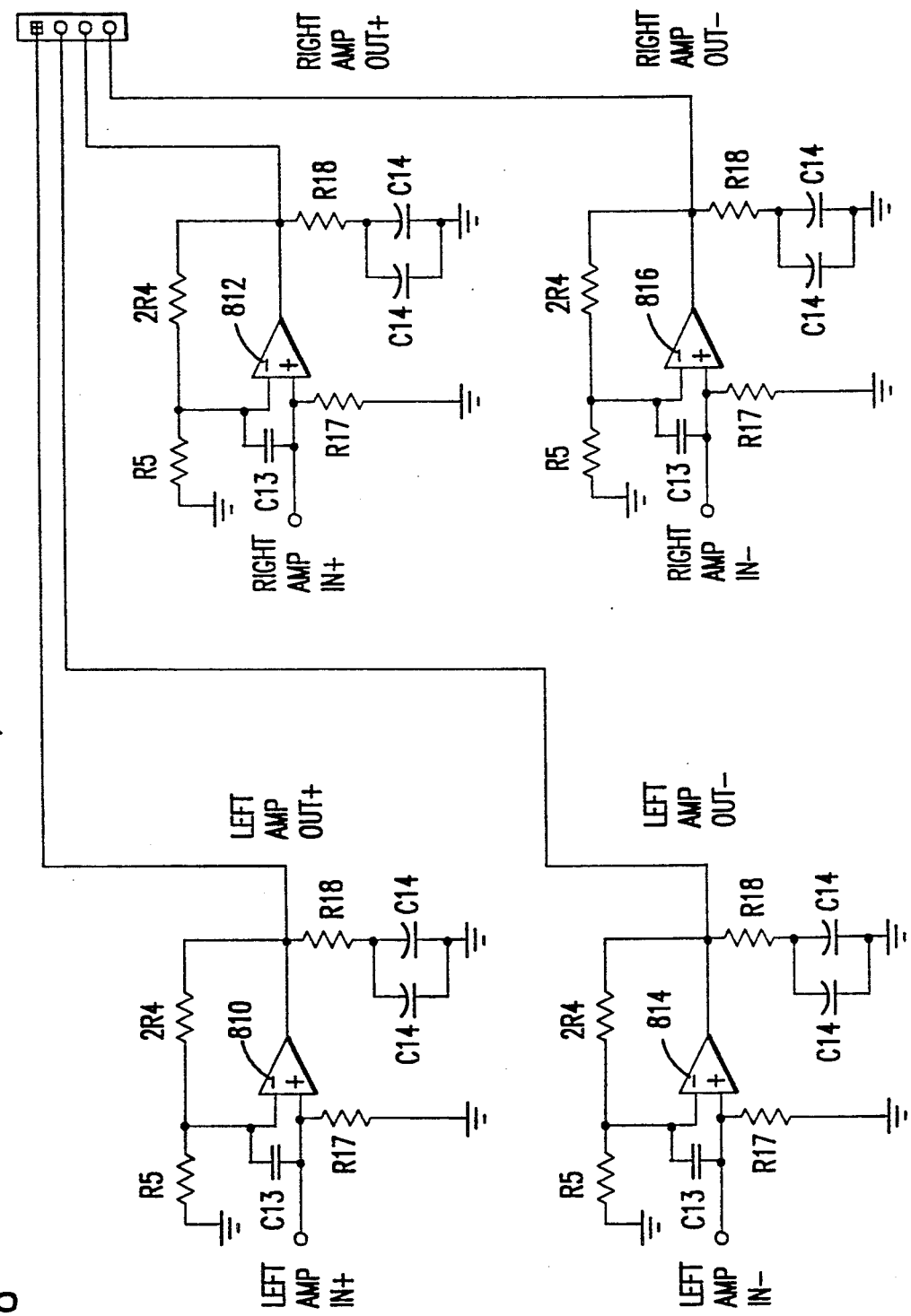
FIG. 8 is a circuit diagram illustrating a preferred embodiment of the audio signal output power amplification circuit of FIG. 4.

FIG. 8 illustrates the power amplification circuit 190 of FIG. 4 as including four identical LM675-type power amplifiers 810, 812, 814 and 816. The gain of each amplifier is 20. The resistor and capacitor values in the power amplification circuit 190 of FIG. 4 are preferably as follows: 10 kOhms for R4, 1 kOhms for R5, 22 kOhms for R17, 1 Ohm (1 Watt) for R18, 0.1 micro-farad for C14, and 500 pico-farads for C13.

FIG. 9 demonstrates four exemplary alternative hook-up configurations 902, 904, 906, 908 for lines running from the amplifiers 190 to the speakers located in each of the zones A–D. Because the output amplifiers 109 are in a balanced bridgeable output configuration, the bridgeable left and right output amplifiers 109 can accommodate left, right, and left plus right speaker hook-up configurations. Preferably, each speaker has its own volume control located within the room where that speaker is placed.

Figure 10:
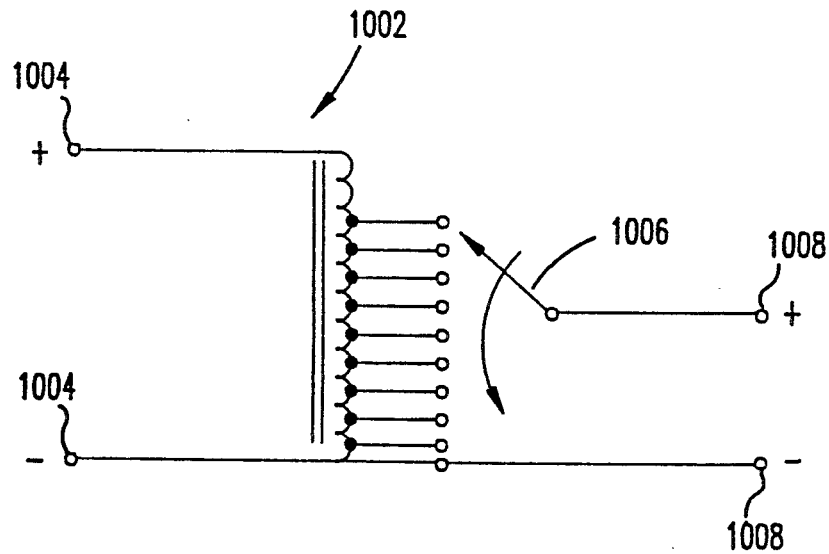
FIG. 10 is a diagram illustrating a volume control audio transformer in accordance with the present invention.

Preferably, an audio transformer configuration 1002 (FIG. 10) is used to provide volume control. The amplifiers 109 connect to the inputs 1004 of the audio transformers 1002. The 10 position selector switch 1006 provides adjustability from zero to full volume. Each audio transformer's output 1008 then feeds a corresponding speaker. Due to the use of four ohm speakers, the volume control audio transformer has a built-in six decibels of attenuation so that the impedance presented to the ADA system from each transformer with a four Ohm speaker is not less than sixteen Ohms.

Unless otherwise indicated, component values represented by the same notation from the different figures (e.g., R1, C50) are the same.

What is claimed is:

1. A signal distribution and communication arrangement for controlling the broadcast of a plurality of different types of signals through speakers located in various zones, comprising:
    an audio receiver for receiving a substantially continuously generated signal;
    a tone generator circuit, responsive to at least one door bell generator signal, for generating a predetermined tone;
    a line interface circuit which is responsive to a page signal received over associated signal lines;
    an amplifier circuit, coupled to the speakers, which amplifies at least the substantially continuously generated signal for broadcast through the speakers;
    in response to the audio receiver, to the tone generator circuit and to the line interface circuit, a control circuit which controls which of the substantially continuously generated signal, the predetermined tone and the page signal should be broadcast through the speakers.

2. A signal distribution and communication arrangement, according to claim 1, wherein the audio receiver includes a threshold detector for providing an automatic muting function when the substantially continuously generated signal is below a prescribed signal magnitude.

3. A signal distribution and communication arrangement, according to claim 2, wherein the threshold detector provides a signal to the control circuit, which signal indicates when the substantially continuously generated signal is below the prescribed signal magnitude.

4. A signal distributed and communication arrangement, according to claim 3, further including delay means, responsive to the threshold detector, for delaying activation of the automatic muting function.

5. A signal distribution and communication arrangement, according to claim 1, wherein the substantially continuously generated signal is primarily music and, in response to the tone generator circuit, the control circuit automatically mutes the music and couples the predetermined tone to the amplifier circuit for amplification and broadcast through the speakers.

6. A signal distribution and communication arrangement, according to claim 1, wherein the substantially continuously generated signal is primarily music and, in response to the line interface circuit, the control circuit automatically mutes the music and couples the page signal to the amplifier circuit for amplification and broadcast through the speakers.

7. A signal distribution and communication arrangement according to claim 6, wherein the page signal includes a page audio signal and wherein the line interface circuit provides feedback control for the page audio signal, to prevent signal degradation of the page audio signal.

8. A signal distribution and communication arrangement, according to claim 2, wherein the arrangement mutes the amplifier circuit in response to the absence of each of the predetermined tone, the page signal and the substantially continuously generated signal.

9. A signal distribution and communication arrangement, according to claim 1, wherein the audio receiver includes a wall plate interface circuit with a signal interruption switch and a gain adjust control for respectively interrupting and adjusting the gain of the substantially continuously generated signal.

10. A signal distribution and communication arrangement, according to claim 1, wherein the substantially continuously generated signal is primarily music, and wherein the audio receiver provides automatic equalization for the music so as to compensate for reduced volume levels and frequency response roll-off.

11. A signal distribution and communication arrangement for controlling the broadcast of a plurality of different types of signals through speakers located in various zones, comprising:
an audio receiver circuit which responds to a music signal from an external music source, and including a threshold detection circuit which provides a music mute function in response to the music signal not exceeding a predetermined signal magnitude;
wherein the threshold detection circuit creates a threshold detection control signal which disables the music mute function in response to the music signals exceeding a predetermined signal magnitude;
a page interface circuit, responsive to a page signal generated from a telephone handset, which generates a paging control signal, serves as a power source to the telephone handset and processes an audio signal from the telephone handset;
a doorbell interface circuit, responsive to any of a plurality of doorbell signal sources at differing locations, which generates a doorbell control signal and activates one of a plurality of corresponding door bell tone sequences identifying the location of the doorbell signal source;
an amplifier circuit, coupled to the speakers, which amplifies the page signal, the music signal and said one of the door bell tone sequences for broadcast by the speakers in each of the zones; and
a control circuit, responsive to the audio receiver circuit and to the page and doorbell interface circuits, which selects and couples one of the music signal, the page signal and said one of the door bell tone sequences to the amplifier circuit.

12. A signal distribution and communication arrangement, according to claim 11, wherein the doorbell interface circuit includes a voltage controlled oscillator having a voltage which is sequentially varied, in response to one of the doorbell signal sources, to produce one of a plurality of corresponding door bell tone sequences.

13. A signal distribution and communication arrangement, according to claim 12, further including a clock circuit which generates an oscillating signal, a sequencer circuit which responds to the oscillating signal by generating a sequence of output signals, and a resistor summation circuit which responds to the sequencer circuit by providing a corresponding voltage to the voltage controlled oscillator.

14. A signal distribution and communication arrangement, according to claim 11, wherein the threshold detection circuit provides a signal to the control circuit, which signal indicates when the music signal is below a prescribed signal magnitude.

15. A signal distribution and communication arrangement, according to claim 11, wherein the page interface circuit equalizes the audio signal from the telephone handset.

16. A signal distribution and communication arrangement for controlling the broadcast of a plurality of different types of signals through speakers located in various zones, comprising:
an audio receiver circuit which responds to a music signal from an external music source, wherein the audio receiver circuit includes a threshold detection circuit which provides a music mute function in response to the music signal not exceeding a predetermined signal magnitude and an automatic equalization circuit which compensates the music signal for reduced volume levels and frequency response roll-off, wherein the audio receiver circuit includes a wall plate interface circuit with a signal interruption switch and a gain adjust control for respectively interrupting and adjusting the gain of the music signal;
wherein the threshold detection circuit creates a threshold detection control signal which disables the music mute function in response to the music signals exceeding a predetermined signal magnitude;
a page interface circuit, responsive to a page signal generated from a telephone handset, which generates a paging control signal, serves as a power source to the telephone and processes audio signals from the telephone handset, wherein the page signal includes a page audio signal and wherein the page line interface circuit provides feedback control for the page audio signal to prevent signal degradation of the page audio signal;

a doorbell interface circuit, responsive to any of a plurality of doorbell signal sources at differing locations, which generates a doorbell control signal and activates one of a plurality of corresponding door bell tone sequences identifying the location of the doorbell signal source;

an amplifier circuit, coupled to the speakers, which amplifies at least the music signal and said one of the door bell tone sequences for broadcast by the speakers in each of the zones; and a control circuit, responsive to the audio receiver circuit and to the page and doorbell interface circuits, which selects and couples one of the music signal, the page signal and said one of the door bell tone sequences to the amplifier circuit.

17. A signal distribution and communication arrangement according to claim 16, wherein the page interface circuit provides feedback control for the page audio signal.

18. A signal distribution and communication arrangement for controlling the broadcast of a plurality of different types of signals, including audio signals from at least one telephone handset, through speakers located in various zones, comprising:

an audio receiver circuit which responds to a music signal from an external music source, wherein the audio receiver circuit includes:

(a) a wall plate interface circuit with a signal interruption switch and a gain adjust control for respectively interrupting and adjusting the gain of the music signal, (b) a automatic equalization circuit which compensates the music signal for reduced volume levels and frequency response roll-off, and (c) a threshold detection circuit which provides a music mute function in response to the music signal not exceeding a predetermined signal magnitude, wherein the threshold detection circuit creates a threshold detection control signal which disables the music mute function in response to the music signals exceeding a predetermined signal magnitude;

page interface circuit, responsive to a short-lived page signal and a page audio signal both generated from said at least one telephone handset, which generates a paging control signal and serves as a power source to the telephone in response to the short-lived page signal being received and passes at least the page audio signal from the telephone handset, wherein the page line interface circuit provides feedback control for the page audio signal to prevent positive feedback of the page audio signal;

a doorbell interface circuit, responsive to any of a plurality of doorbell signal sources at differing locations, which generates a doorbell control signal and activates one of a plurality of corresponding door bell tone sequences identifying the location of the doorbell signal source;

an amplifier circuit, coupled to the speakers, which amplifies at least the music signal and said one of the door bell tone sequences for broadcast by the speakers in each of the zones; and a control circuit, responsive to the audio receiver circuit and to the page and doorbell interface circuits, which selects and couples one of the music signal, the page signal and said one of the door bell tone sequences to the amplifier circuit.

19. A signal distribution and communication arrangement, according to claim 18, wherein the control circuit, in response to more than one of the music signal, the page signal and said one of the door bell tone sequences being received together, prioritizes these signals so that the page signal has highest priority, said one of the door bell tone sequences has intermediate priority and the music signal has lowest priority.

20. A signal distribution and communication arrangement, according to claim 18, wherein arrangement includes means of providing each speaker with its own volume control located near one of the speakers.

* * * * *